United States Patent
Härdtle et al.

(10) Patent No.: US 7,419,455 B2
(45) Date of Patent: Sep. 2, 2008

(54) PREVENTING REVERSE CREEP IN A MOTOR VEHICLE

(75) Inventors: Wilhelm Härdtle, Markdorf (DE); Manfred Schwab, Pasau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 16 days.

(21) Appl. No.: 10/482,361

(22) PCT Filed: Jul. 17, 2002

(86) PCT No.: PCT/EP02/07911

§ 371 (c)(1),
(2), (4) Date: Dec. 29, 2003

(87) PCT Pub. No.: WO03/011663

PCT Pub. Date: Feb. 13, 2003

(65) Prior Publication Data

US 2004/0189081 A1    Sep. 30, 2004

(30) Foreign Application Priority Data

Jul. 21, 2001    (DE) .............................. 101 35 744

(51) Int. Cl.
*B60W 10/18*    (2006.01)
*B60T 8/24*    (2006.01)

(52) U.S. Cl. .................................. 477/93; 303/192

(58) Field of Classification Search ................ 303/191, 303/9.62, 192, 113.5; 477/92, 93, 70, 71, 477/94, 95

See application file for complete search history.

(56) References Cited

U.S. PATENT DOCUMENTS

| 4,867,291 | A | * | 9/1989 | Holman et al. ............ 192/219.3 |
| 5,052,531 | A | * | 10/1991 | Bota ........................ 192/219.1 |
| 5,474,164 | A | * | 12/1995 | Berger ...................... 192/219.2 |
| 5,741,200 | A |   | 4/1998 | Taniguchi et al. ............. 477/93 |
| 5,820,515 | A |   | 10/1998 | Fukaya et al. .................. 477/92 |
| 5,911,646 | A | * | 6/1999 | Tsutsui et al. .................. 477/93 |
| 6,086,515 | A |   | 7/2000 | Buschmann et al. ........ 477/194 |
| 6,231,467 | B1 | * | 5/2001 | Korner et al. ............... 475/113 |

(Continued)

FOREIGN PATENT DOCUMENTS

DE    1 952 552    4/1971

(Continued)

*Primary Examiner*—Thomas J Williams
(74) *Attorney, Agent, or Firm*—Davis Bujold & Daniels, P.L.L.C.

(57) ABSTRACT

An apparatus and a process for the prevention of the rollback of a vehicle with a vehicle braking system (18), wherein a braking system (18) comprises a vehicle brake pressure modifying apparatus (20); a device (28, 34, 36) which are enabled to recognize a forward movement of the vehicle, and a brake control apparatus (16), which is connected to the vehicle brake pressure modifying apparatus (20) and the device (28). There is generated in the control apparatus (16) a signal which, upon a standstill of the vehicle, activates a brake and sensor combination (8, 28) which acts upon a transmission (2) of the vehicle, the brake and the sensor combination (8, 28) being supplementary to the brakes of the vehicle brake system (18) and, upon a recognition of a forward motion of the vehicle, the braking fluid pressure in the vehicle brake pressure modifying apparatus (20) is reduced and thus the brake and the sensor combination (8, 28) acting upon the transmission is released.

12 Claims, 1 Drawing Sheet

U.S. PATENT DOCUMENTS

| | | |
|---|---|---|
| 6,244,402 B1 | 6/2001 | Domian et al. ............. 192/3.51 |
| 6,315,372 B1 * | 11/2001 | Kroger et al. ................ 303/191 |
| 6,439,675 B1 * | 8/2002 | Zechmann et al. .......... 303/191 |
| 6,561,938 B1 * | 5/2003 | Korner et al. ................. 475/59 |
| 6,679,810 B1 * | 1/2004 | Boll et al. .................... 477/195 |
| 6,814,414 B1 * | 11/2004 | Schmitt et al. .............. 303/191 |

FOREIGN PATENT DOCUMENTS

| | | |
|---|---|---|
| DE | 25 22 421 | 12/1976 |
| DE | 27 57 799 | 6/1978 |
| DE | 197 11 515 A1 | 10/1997 |
| DE | 196 25 355 A1 | 1/1998 |
| DE | 198 26 068 A1 | 12/1999 |
| DE | 696 12 142 T2 | 7/2001 |
| EP | 0 280 818 A1 | 12/1987 |
| EP | 0 507 466 A1 | 10/1992 |
| GB | 1 597 100 | 9/1981 |

* cited by examiner

PREVENTING REVERSE CREEP IN A MOTOR VEHICLE

This application is a national stage completion of PCT/EP02/07911 filed Jul. 17, 2002 which claims priority from German Application Serial No. 101 35 744.3 filed Jul. 21, 2001.

FIELD OF THE INVENTION

The invention concerns both an apparatus and a process to avoid the backroll of a standing vehicle.

BACKGROUND OF THE INVENTION

Where an application involves a transmission with automatic gear shifting, especially in commercial vehicles, a backroll blocking agent, otherwise known as a "hill-holder", is desired to provide security against reverse movement during a temporary stop. This desire arises especially from the fact that automatic transmissions are being increasingly used in those fields in which torque converter transmissions were previously employed. Because of the inherent characteristics of torque converters, however, these possess a tendency for forward creep, which hinders or at least minimizes backrolling.

Release devices for automatic transmissions have been made known, wherein an electronically controlled vehicle brake can be installed to function as a backroll blocker. Functional logic programming adds to the release of an energized vehicle brake; a signal of increasing torque of the frictional clutch binding the motor to the transmission. By a coincidence of a declining braking moment at the vehicle brakes and a simultaneous increase of traction-torque of the vehicle clutch, the function of backroll blocking is created.

EP 0 280 818 A1 discloses a braking system governing an apparatus, which recognizes the position of the vehicle and, following the establishment of a predetermined torque, which torque is transmitted from the motor to the vehicle wheels, a valve in the brake system opens, thus reducing the brake pressure, allowing the vehicle to again start forward.

In the manner of an example, DE 198 26 068 teaches of a transmission brake, which can be placed in a vehicle transmission, wherein it serves to assist in the synchronization of the located gear drive therein. Since the inertia of the transmission, this is carried out upon the synchronization of rotating parts, which rotates at varying speeds, can be braked through a shifting procedure through a transmission braking system with the result that the shifting procedure is accelerated. The transmission brake system is normally designed in lamellate fashion and is controlled by a pressure medium, usually oil, by means of a piston.

The purpose of the present invention is to provide the functionality of the backroll brake. At the same time, the purpose is to provide assurance that, even in the case of disturbances or failure of operation of the vehicle braking system, no critical condition can arise.

SUMMARY OF THE INVENTION

An apparatus for the prevention of backroll of a vehicle is proposed, employing the use the of the brakes of a vehicle braking system, which includes in mutual operational combination a vehicle braking pressure biasing device, (hereinafter "brake modifier"); an apparatus which recognizes a forward motion of the vehicle and a control device which is in connection with the brake modifier and the apparatus. A brake is provided acting on a gear train of the transmission of the motor vehicle. This brake is governed by a control system and, during a period of standstill or a nearly still-stand condition of the vehicle, the brake can be activated by the control system to act in addition to the vehicle braking system. Further, a process for the prevention of backrolling of a vehicle is proposed with a vehicle braking system, which includes the brake modifier in the combination described and functioning as above. With this equipment, a signal is produced in the control system. Upon a standstill of the vehicle or upon a condition nearly at a standstill, this signal activates a coacting brake on the transmission of the motor vehicle. This coacting brake is separate from and, in addition to, the vehicle braking system. Upon a recognition of a forward movement of the vehicle, the control apparatus reduces the pressure of the braking fluid in the brake modifier and releases the brake which acts upon the transmission. In an advantageous rendition, the brake modifier is an adjustable holding valve regulating brake power. In one embodiment, the apparatus, which is designed to detect forward motion of the vehicle; a clutch directional sensor is installed whereby the control system detects an overstepping of a predetermined clutch adjustment path. In another embodiment designed to recognize the forward movement of a vehicle, the apparatus is a sensor for the transmitted torque from the clutch. In this way, the overstepping of a preset clutch moment is recognized. Advantageous embodiments include a speed of rotation sensor being placed in the input drive string which can pickup a direction of rotation. By this means, from an existing speed of rotation in a specific direction of rotation, the control decision can be made relative to the forward movement of the vehicle. Another of these embodiments allows the speed of rotation sensor to be placed on the output drive shaft of the transmission. In yet another embodiment example, the ABS-sensor (ABS=Anti-Blocking System) is used on a vehicle wheel, in order that recognition will be provided as to the direction of travel from the current RPM and the direction of wheel rotation. One embodiment shows that brake, which acts upon the transmission, to be a lamellar brake, which is located on an auxiliary shaft in a shifting gear train of the transmission of the vehicle. In yet another version, the brake, which acts upon the transmission, is again a lamellar brake, but which is placed on the input shaft of the shifting gear train of the transmission of the vehicle. A lamellar brake placed in a differential in the input drive string can be used in like manner. Similarly, in another embodiment, even a transmission oil pump can be made to act as a brake, which is then adjusted by means of zero delivery and blocked. By means of cutting the through-flow, a sufficient braking moment can be achieved. Likewise, the function of a brake can also be achieved by inciting stress in the transmission. The stress is brought about in automatic shifting when two separate gear stages of a transmission shift simultaneously and thereby the shifting transmission is blocked.

The transmission brake, which normally functions as an element for the support of synchronization, as the brake restricts the rotating mass in the transmission in such a manner, that equal speeds of rotation are achieved for those elements which are locked together for torque transmission, is further put to use without change and serves as a functional element for the prevention of rollback. In the case of an activated backroll blockage of the vehicle braking system when the standstill state of the vehicle is detected by appropriate ABS-sensors of the vehicle, then the brake can be additionally applied in the gear train of the vehicle. Advantageously, this gear train is the vehicle shifting transmission itself. Thereby, in a failure fault of vehicle brakes or faulty operation on the part of the vehicle driver, the danger of a backroll of the vehicle is avoided.

By means of the invented equipment, a redundancy is attained upon the failure of the normally provided system for the fulfilling of a rollback prevention function. An extended level of safety for the entire system is achieved. The equipment can be used, not only with the electronically controlled brakes, but also with normal pneumatically or hydraulically activated brakes operated by means of pedal pressure from the driver.

BRIEF DESCRIPTION OF THE DRAWING

The invention will now be described, by way of example, with reference to the accompanying drawings in which.

DETAILED DESCRIPTION OF THE INVENTION

Figure 1:
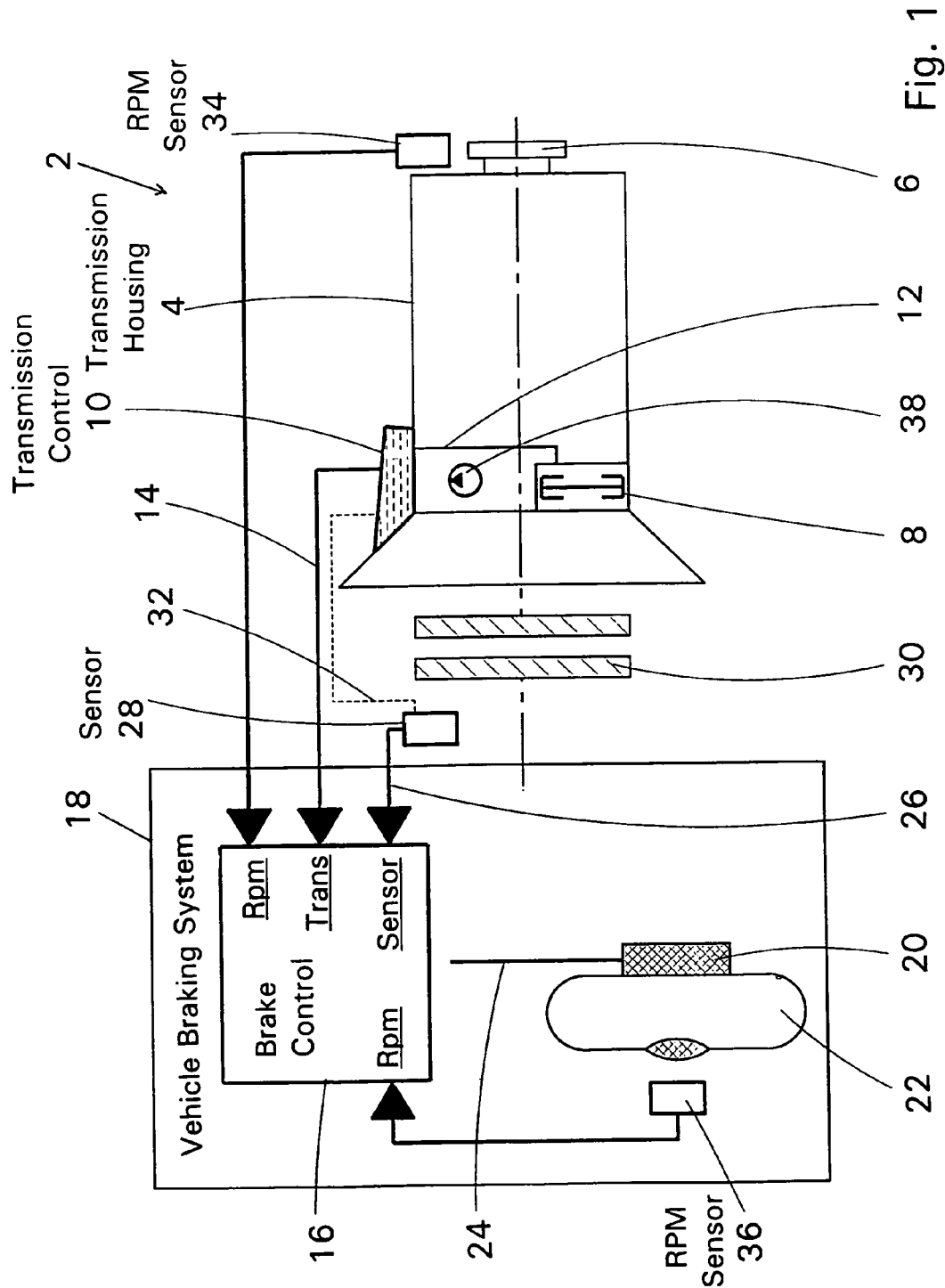
FIG. 1 schematically shows a shiftable vehicle transmission with a transmission housing and an output drive shaft.

The FIG. 1 schematically shows a shiftable vehicle transmission 2 with a transmission housing 4 and an output drive shaft 6. In the transmission housing 4 is located a brake 8, 8', which acts upon rotating masses within the transmission 2. One embodiment shows brake 8, which acts upon the transmission 2, to be a lamellar brake, which is located on an auxiliary shaft 40 in shifting transmission 2 of the vehicle. In yet another version, the brake 8' is again a lamellar brake but which is placed on the input shaft 42 of the shifting transmission 2 of the vehicle. The activation of the brake 8, 8'is executed by a transmission control 10 which, by means of a line 12, stands in communication with the brake 8, 8'. The transmission control 10 is connected through a line 14 with an electronic brake control 16 of a vehicle braking system 18. An apparatus (i.e., a brake modifier 20) for the modification of the vehicle brake system pressure is shown here in a simplified presentation and connected to a wheel 22 of the vehicle. The brake modifier 20 receives signals over a line 24. Likewise, said brake control apparatus 16 is connected by a line 26 with a sensor 28 which, from a vehicle clutch 30, can pickup either an adjustment path or a transmitted moment and transmits this to the brake control 16. In the case of the vehicle transmission which, besides automatic shifting, is also provided with an automatic clutch, said sensor 28 can be in direct contact with the transmission control 10, which is indicated by a dotted line 32. In such a situation, the signals from the clutch 30 are then forwarded by the transmission control 10 to the brake control 16. As an additional and alternative apparatus for the recognition of a forward motion of the vehicle, a sensor 34 for speed of rotation is indicated, which captures the speed or rotation as well as the direction of rotation of the output drive shaft 6 and transmits these data to the brake control 16. A provided ABS-RPM sensor 36 on the vehicle wheel 22 can, likewise, transmit speed of rotation and direction of rotation of the wheel of the vehicle to the brake control 16. Obviously, it is not necessary that all the forward-direction detecting sensors be provided at the same time, but these can produce the necessary signals in an alternate installation.

When the vehicle is standing still and the backroll blockage for the vehicle is activated by the brake control 16 then, in addition, brake 8, 8'is also activated and thereby the transmission 2 is blocked. Under these circumstances, that portion of the input drive string of the transmission 2 directed at the vehicle wheels 22 is now blocked from the transmission 2 to said wheels 22. Thereby is guaranteed an additional assurance for the vehicle against backrolling. Now if a startup is begun by the vehicle driver, then from the sensors 28, 34 or 36, any forward movement of the vehicle is detected. When the brake control 16 becomes aware of such an introduced forward movement then the brake modifier 20 is so commanded that the brake pressure is reduced. The brake 8, 8' is released and the transmission 2 is no longer blocked so that the vehicle is allowed to proceed in its forward direction. A transmission oil pump 38 in the transmission 2 which, otherwise, serves for the lubrication of the transmission 2, is able to perform at a braking function, either at a standstill or in a nearly standstill condition of the vehicle. This is brought about by means of a blockage of the through-put of said oil pump 38.

REFERENCE NUMERALS 2 shiftable transmission for a vehicle
4 transmission housing
6 output drive shaft
8 a brake (located within transmission housing)
10 transmission control
12 line
14 line
16 brake control for vehicle
18 vehicle braking system
20 brake Modifier (Apparatus for the modification of the vehicle braking pressure)
22 wheel of vehicle
24 connection line
26 line
28 sensor
30 vehicle clutch
32 line
34 sensor for the speed of rotation
36 sensor for the speed of rotation
38 oil pump

The invention claimed is:

1. An apparatus for preventing roll back of a vehicle in which the vehicle includes a clutch (30) for supplying a drive torque to a transmission (2), the apparatus comprising:
  a vehicle braking system (18) including a vehicle brake pressure modifying apparatus (20) for controlling braking of wheels of the vehicle;
  a transmission brake (8, 8') located within the transmission (2) for braking a drive train of the transmission (2) when activated;
  a movement detection device (28, 34, 36) for detecting an initiation of a movement of the vehicle and the movement detection device including at least one of:
    a clutch direction sensor responsive to a directionally dependent clutch motion exceeding a predetermined clutch adjustment path limit;
    a clutch torque sensor responsive to a transmitted clutch torque exceeding a predetermined clutch movement limit;
    a direction of rotation sensor detecting a direction of rotation in a transmission input drive train;
    a speed of rotation sensor detecting a rotational speed of a transmission output drive shaft;
    a direction of wheel rotation signal from an anti-locking braking system; and
  a brake control apparatus (16) controlling operation of both the vehicle braking system (18) and the transmission brake (8, 8'), the brake control apparatus (16) being responsive to operation of the clutch (30) and operation of the movement detection device (28, 34, 36) for engaging the transmission brake (8, 8') to prevent backrolling of the vehicle when the clutch (30) is disengaged and the movement detection device (28, 34, 36) indicates that the vehicle is at least one of at standstill and at near standstill; and engaging the clutch (30) to provide the drive torque to the transmission (2);

detecting by operation of a movement detection device (24, 34, 36) when the clutch (30) is sufficiently engaged for the drive torque transmitted through the clutch (30) to the transmission (2) to prevent backrolling of the vehicle; and disengaging the transmission brake (8, 8') after engagement of the clutch (30) to allow the drive torque through the transmission (2) to cause movement of the vehicle.

2. The apparatus for the prevention of backrolling of a vehicle according to claim 1, wherein the vehicle brake pressure modifying apparatus (20) is a variable brake power restraining valve.

3. The apparatus for the prevention of the backrolling of a vehicle according to claim 1, wherein the apparatus further comprises a clutch path sensor (28) for sensing forward motion of the vehicle.

4. The apparatus for the prevention of the backrolling of a vehicle according to claim 1, wherein the apparatus further comprises, a sensor (28) which captures torque transmitted from a clutch (30) and has a capability of recognizing forward movement of the vehicle.

5. The apparatus for the prevention of the backrolling of a vehicle according to claim 1, wherein the device is a speed of rotation sensor (34, 36) with a capability of sensing a direction of rotation and is adaptable to recognize forward movement of the vehicle.

6. The apparatus for the prevention of the backrolling of a vehicle according to claim 5, wherein the speed of rotation sensor is a transmission output shaft speed of rotation sensor (34).

7. The apparatus for the prevention of the backrolling of a vehicle according to claim 5, wherein the speed of rotation sensor (36) is an ABS-speed of rotation, sensor on a vehicle wheel (22).

8. The apparatus for the prevention of the backrolling of a vehicle according to claim 1, wherein the transmission brake (8, 8') which acts upon the transmission (2) is a lamellar brake placed on an auxiliary shaft (40) of the transmission (2) of the vehicle.

9. The apparatus for the prevention of the backrolling of a vehicle according to claim 1, wherein the transmission brake (8, 8') which acts upon the transmission (2) is a lamellar brake placed on an input drive shaft (42) of the transmission (2) of the vehicle.

10. The apparatus for the prevention of the backrolling of a vehicle according to claim 1, wherein the transmission brake (8, 8') which acts on the transmission (2) is activated by simultaneous engagement of two shift stages.

11. A method for prevention of the backrolling of a vehicle having a vehicle braking system (18), a transmission brake (8, 8') and a clutch (30) for supplying a drive torque to a transmission (2), the method comprising the steps of:

when the vehicle is at least one of at standstill or nearly at standstill and when the clutch (30) is disengaged, engaging the transmission brake (8, 8') to prevent backrolling of the vehicle;

engaging the clutch (30) to transmit the drive torque through the clutch (30) to the transmission (2);

detecting by operation of a movement detection device (24, 34, 36) when the clutch (30) is sufficiently engaged for the drive torque transmitted to the transmission (2) to prevent backrolling of the vehicle; wherein the movement detection device (24, 34, 36) detects at least one of:
- a directionally dependent clutch motion exceeding a predetermined clutch adjustment path limit;
- a transmitted clutch torque exceeding a predetermined clutch movement limit;
- a direction of rotation in a transmission input drive train;
- a rotational speed of a transmission output drive shaft; and
- a direction of wheel rotation from an anti-locking braking system; and disengaging the transmission brake (8, 8') after engagement of the clutch (30) to allow the drive torque through the transmission (2) to cause movement of the vehicle.

12. A method for prevention of the backrolling of a vehicle having a vehicle braking system (18), a transmission brake (8, 8') and a clutch (30) for supplying a drive torque to a transmission (2), and a brake control apparatus (16) communicating with the clutch (30), the vehicle braking system (18) and a movement recognizing device (28, 34, 36), the method comprising the steps of:

indicating when the clutch (30) is sufficiently engaged to cause movement of the vehicle;

recognizing a start of a movement of the vehicle via the movement recognizing device (28, 34, 36);

engaging the transmission brake (8, 8') located in the transmission (2) to brake a drive train of the transmission and prevent backrolling of the vehicle when the clutch (30) is disengaged and when the vehicle is at least one of at standstill or nearly at standstill; and when movement of the vehicle is desired, engaging the clutch (30) and disengaging the vehicle braking system (18) such that the movement detection device (28, 34, 36) indicates a start of the movement of the vehicle; and only disengaging the transmission brake (8, 8') once the movement detection device (28, 34, 36) indicates a start of the movement of the vehicle.

* * * * *